(12) United States Patent
Johansson

(10) Patent No.: US 6,899,749 B2
(45) Date of Patent: May 31, 2005

(54) APPARATUS FOR MOISTURE ABSORPTION

(76) Inventor: Thomas Johansson, Per Kristens gard, Sloinge (SE), SE-310 42

( * ) Notice: Subject to any disclaimer, the term of this patent is extended or adjusted under 35 U.S.C. 154(b) by 0 days.

(21) Appl. No.: 10/398,251
(22) PCT Filed: Oct. 2, 2001
(86) PCT No.: PCT/SE01/02128
§ 371 (c)(1), (2), (4) Date: Apr. 2, 2003
(87) PCT Pub. No.: WO02/28742
PCT Pub. Date: Apr. 11, 2002

(65) Prior Publication Data
US 2004/0099141 A1 May 27, 2004

(30) Foreign Application Priority Data
Oct. 5, 2000 (SE) ............................... 0003599

(51) Int. Cl.⁷ .......................... B01D 53/04; B01D 53/26
(52) U.S. Cl. .................. 96/119; 34/80; 34/85; 34/87; 55/433; 95/91
(58) Field of Search .................. 34/72, 79, 80, 34/85, 87, 472, 509, 78; 55/428, 432, 433; 95/91; 96/118–120

(56) References Cited

U.S. PATENT DOCUMENTS

| | | | |
|---|---|---|---|
| 894,973 A * | 8/1908 | Morgan ..................... | 96/119 |
| 1,914,941 A * | 6/1933 | Downs ....................... | 96/120 |
| 1,920,915 A * | 8/1933 | Poggel ....................... | 96/120 |
| 2,036,909 A * | 4/1936 | Baker ......................... | 96/119 |
| 2,341,893 A * | 2/1944 | Baker ......................... | 96/119 |
| 2,403,880 A * | 7/1946 | Taft ............................ | 96/119 |
| 2,504,184 A * | 4/1950 | Dawson ...................... | 96/136 |
| 2,735,511 A * | 2/1956 | Holmberg ................... | 55/418 |
| 2,738,225 A * | 3/1956 | Meek .......................... | 239/55 |
| 3,248,862 A | 5/1966 | Lovercheck | |
| 3,259,996 A * | 7/1966 | Hull et al. ................... | 34/563 |
| 3,277,636 A * | 10/1966 | Hemmerlein ............... | 96/119 |
| 3,400,515 A * | 9/1968 | Ackerman ................... | 96/118 |
| 4,319,679 A * | 3/1982 | Gustafsson ................. | 206/0.5 |
| 4,394,144 A * | 7/1983 | Aoki ........................... | 96/119 |
| 4,927,436 A * | 5/1990 | Glienke ....................... | 96/119 |
| 5,215,561 A * | 6/1993 | Cameron .................... | 96/119 |
| 5,673,493 A * | 10/1997 | Kazakis et al. ............. | 34/80 |
| 5,676,739 A | 10/1997 | Gustafsson ................. | 96/119 |
| 5,813,564 A | 9/1998 | Luo ............................ | 220/522 |
| 5,897,691 A * | 4/1999 | Hunsinger et al. .......... | 96/108 |
| 5,907,908 A * | 6/1999 | Cunanan et al. ............ | 34/61 |
| 6,273,942 B1 * | 8/2001 | Jersby ........................ | 96/118 |
| 6,312,488 B1 * | 11/2001 | Fischer ....................... | 55/315 |
| 6,344,072 B1 * | 2/2002 | Gustafsson ................. | 96/119 |
| 6,423,122 B1 * | 7/2002 | Kelders ...................... | 96/119 |

FOREIGN PATENT DOCUMENTS

| | | |
|---|---|---|
| EP | 0212029 | 3/1987 |
| SE | 419630 | 8/1981 |
| SE | 501601 | 3/1995 |

OTHER PUBLICATIONS

International Search Report for PCT/SE01/02128.

* cited by examiner

*Primary Examiner*—Robert H. Spitzer
(74) *Attorney, Agent, or Firm*—Ostrolenk, Faber, Gerb & Soffen, LLP

(57) ABSTRACT

A moisture absorption apparatus comprises a desiccant container with a side wall and optionally a bottom and a desiccant solution container with a side wall and a bottom. The desiccant container receives particulate desiccant which forms a desiccant solution on contact with moist air. The desiccant container side wall has at least one air access opening and a passage permitting desiccant solution to flow into the desiccant solution container. The desiccant solution container has a top opening and is slidingly displaceable on the desiccant container so as to allow the desiccant container to be displaced in the desiccant solution container to a depth sufficient for the desiccant solution container side wall to fully cover the air access opening of the desiccant container.

20 Claims, 2 Drawing Sheets

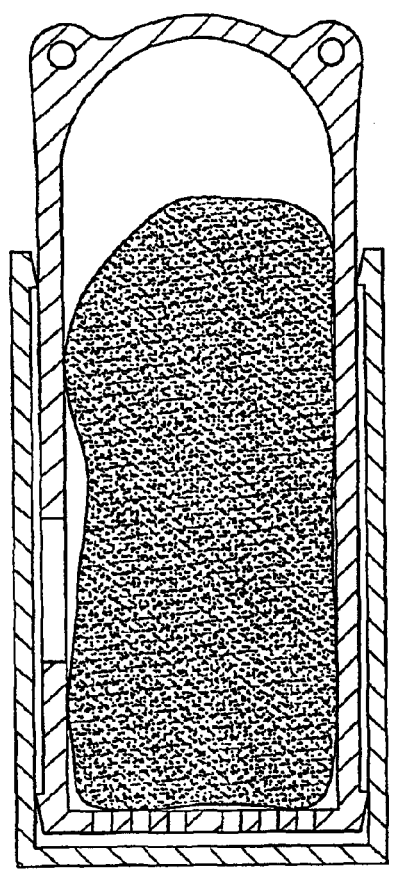
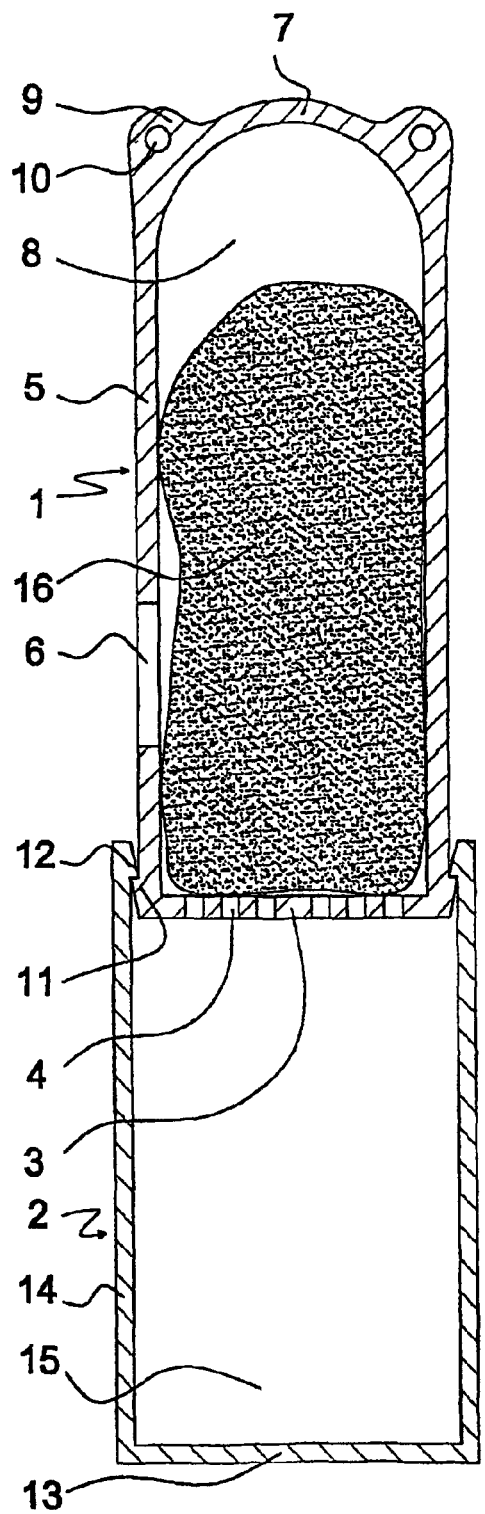
Fig. 1a
Fig. 1b

APPARATUS FOR MOISTURE ABSORPTION

FIELD OF THE INVENTION

The present invention relates to the field of dehumidification, in particular to a moisture absorption apparatus provided with a desiccant in an upper chamber. More particularly, the present invention relates to a moisture absorption apparatus for keeping the atmosphere in a transport container in a dry state.

BACKGROUND OF THE INVENTION

The present invention departs from the tubular moisture-absorbing apparatus disclosed in U.S. Pat. No. 5,676,739 (Gustafsson) designed for vertical disposition in, for instance, a closed steel container for transport of humidity-sensitive goods. The apparatus is made of a polymer coated board which provides required stiffness. Starting from its upper end, it comprises, in a longitudinal direction, a chamber with a moisture-absorbing material, such as calcium chloride, which forms an aqueous solution on contact with humid air. The salt solution is continuously drained into a lower liquid collection chamber in form of a plastic container with which the upper chamber is in communication. The particulate desiccant material is retained in the upper chamber by sieve means comprising a non-return valve means. Contact of the desiccant with ambient air is ensured by a netting element located in front of an opening in the wall of the upper chamber. The netting element is designed to prevent the aqueous solution from leaving the upper chamber through it rather than through the sieve means. Prior to use the netting element and thus the opening in the wall of the upper chamber is closed by a removable plastic foil.

While the moisture-absorbing apparatus of Gustafsson has been shown to function well in industrial practice, there is room for improvement. In particular, the known apparatus is bulky. This is a disadvantage in transport and storage prior to use.

OBJECTS OF THE INVENTION

A primary object of the present invention is to provide an apparatus of the aforementioned kind which is less bulky than known devices of this kind and, therefore, easier to store and transport.

Further objects of the invention will become evident from the following summary of the invention, the drawings, the description of preferred embodiments, and the claims.

SUMMARY OF THE INVENTION

According to the present invention is disclosed a moisture absorption apparatus for keeping the atmosphere in a transport container in a dry state, comprising a desiccant container having a side wall, optionally a bottom and means to retain the desiccant in the container, further comprising a desiccant solution container having a side wall and a bottom, the desiccant container being capable of receiving desiccant which forms a desiccant solution on contact with moist air, the desiccant container side wall having at least one air access opening and a passage permitting desiccant solution to flow into the desiccant solution container, the desiccant solution container having a top opening and being slidingly displaceable on the desiccant container so as to allow the desiccant container to be displaced in the desiccant solution container to a depth sufficient for the desiccant solution container side wall to fully cover the air access opening of the desiccant container, the apparatus further comprising means to prevent separation of the desiccant container and the desiccant solution container.

It is preferred for the separation preventing means to comprise cooperating circular flanges of the desiccant container and the desiccant solution container. It is particularly preferred for the separation preventing means to comprise barbed profiles. Also preferred are snap connections that can be opened to allow separation of the containers, in particular for emptying the desiccant solution container.

Also other separation preventing means are conceivable, such as a flexible element, such as a string or cord (which may be elastic enough to allow temporary separation of the containers for emptying), secured at its respective ends at the container bottoms.

Preferably the desiccant container and the desiccant solution container are of generally cylindrical or parallelepipedal form. It is also preferred for the the moisture apparatus of the invention to comprise means for fastening it to a wall of a transport container.

In a pre-use condition, the desiccant container is inserted into the desiccant solution container at least far enough to make the latter cover the air access opening of the former to be fully covered. Thereby the desiccant is protected against the action of moist air. Thereby the desiccant solution container acts as a protective cover corresponding to the removable plastic foil of the prior art apparatus referred to above.

When making the apparatus of the invention ready for use, the apparatus is placed in an upright position, that is, for instance, with the bottom of the desiccant solution container resting on a support surface, and the desiccant container is lifted out of the desiccant solution container. Cooperating holding means, such as, for instance, holding means disposed at the outer wall of the desiccant container and the inner wall of the desiccant solution container prevent the containers from being fully separated. It is preferred for the holding means of the desiccant solution container to exert a sealing function in a pre-use state.

The apparatus of the invention may be designed for single or multiple use. In case of a single-use design, the apparatus is provided with the closed desiccant container filled with a charge of desiccant. In such case the desiccant container may comprise two openings or sets of openings only: one in its side wall for air access, the other at its bottom for escape of desiccant solution. In a pre-use condition, the desiccant container is inserted into the desiccant solution container at least far enough to make the latter cover the air access opening of the former to be fully covered. Thereby the desiccant is protected against the action of moist air. Thereby the desiccant solution container acts as a protective cover corresponding to the removable plastic foil of the prior art apparatus referred to above.

The containers can be made from any suitable polymer material, such as high density polypropylene, polyvinyl chloride, polystyrene or polyvinylacetate.

In case of a multiple-use design, the desiccant container in addition comprises a refill opening, preferably disposed at its top section, provided with a screw lock or similar.

It is within the scope of the invention to provide the desiccant either in particulate free flowing form or in form of a refill cartridge permeable to moist air and desiccant solution, such as a filter paper or non-woven polymer cartridge. The moisture apparatus for multiple use comprises a through opening in the top portion of the desiccant container closed by a removable plug or similar. Also preferred is to fill the desiccant container through the air access opening in its side wall. This opening can be provided with a desiccant retaining net or grid, such as a net or grid fixed to a frame which can be mounted by, for instance, snapping onto the desiccant container side wall at the area surrounding the air access opening. A preferred variant is to make the desiccant container in two parts, a trough-like part in which one short end (the lower or bottom end in use) is a perforated wall through which the desiccant solution passes into the desiccant solution container, and a lock-like part comprising the air access opening. The lock part can be snapped on the trough part after filling with desiccant and can be unsnapped after use for loading again with desiccant. Particularly preferred is this two-part design of the desiccant container when the latter takes a parallelepipedal form.

It is preferred for a multiple-use apparatus of the invention to comprise a desiccant solution emptying through opening in the bottom of desiccant solution container closed by a removable plug or similar. Alternatively the desiccant solution container may be emptied by temporarily separating it, fully or partially, from the desiccant container.

The moisture absorption apparatus of the invention preferably comprises sealing means disposed at the desiccant solution container wall, in particular at the inner face of the desiccant solution container side wall in the vicinity of the top opening.

Preferably the desiccant container and the desiccant solution containers are of oblong shape, for instance, tubular shape. In this context, "axial(ly)-" refers to the desiccant or desiccant solution container axis. Since the apparatus of the invention is designed for use in an upright position, "top" and "bottom" refer to this working position. The apparatus is kept in the working position by, for instance, a wire fastened at an eye provided at the upper end of the desiccant container and, with its other end, at a suitable point of fixation at the inner wall of a steel container or other compartment.

A preferred deliquescent desiccant is calcium chloride or desiccant mixtures containing calcium chloride but, in principle, all desiccants becoming deliquescent on contact with humid air can be used. The aqueous solution of the desiccant flows through the bottom opening(s) of the desiccant container into the desiccant solution container. Non-return valve(s) may be arranged at the bottom opening(s) but this is of no importance for the performance of the apparatus of the invention; its (their) only function is to prevent liquid from flowing back from the desiccant solution container to the desiccant container and out from there in the event the apparatus falls on the floor by the suspending wire breaking or coming loose. Preferably the desiccant is constituted by free-flowing particles. It may also advantageously be provided in form of a cartridge filled with particulate desiccant, the cartridge having walls permeable to atmospheric humidity and aqueous desiccant solution.

According to a preferred aspect of the invention the air access opening area is variable to adapt the apparatus of the invention to various drying needs. A large area provides a high drying rate, whereas a smaller area provides a lower drying rate. A high drying rate is preferred in applications where the humidity shall be lowered quickly, for instance, after loading a transport container in a tropical humid climate. Since it is, however, not necessary for most applications to provide a relative humidity in the transport container of below 75%, except for some applications for which a relative humidity below 50% is required, the long-term maintenance of a large-window version of the apparatus of the invention would keep the humidity in the transport container at an unnecessary low level which economically unsound. For long-term maintenance of an adequate humidity level, such as humidity level between 50% and 75%, the use of an apparatus with a smaller air access opening according to the invention is adequate and preferred. It is within the scope of the invention to provide a set of apparatus of the invention comprising a number of such apparatus which differ in regard of their air access opening area. It is also feasible and preferred to provide an apparatus of the invention with a variable air access area; this variation can be accomplished by, for instance, a plate which is disposed slidably over the air access opening area in parallel guide profiles attached externally to the desiccant container side wall on either long side of the air access opening.

The same result can also be obtained by using the desiccant solution container as an air access opening shielding means. Thus, according to another preferred aspect of the invention, the desiccant solution container is fixable at a position in which it partially shields the air access opening.

According to still another preferred aspect of the invention a set of apparatus differing in their air access opening area is provided.

The invention will now be explained in more detail by reference to two preferred embodiments of the invention illustrated in a drawing.

BRIEF DESCRIPTION OF THE DRAWING

FIG. 1a shows a single-use first embodiment of the apparatus of the invention, in a storage state and in an axial sectional view;

FIG. 1b shows the embodiment of FIG. 1a, in an active state, in the same view;

FIG. 2a shows a multiple-use second embodiment of the apparatus of the invention, in the same state and view as the embodiment of FIG. 1a;

Figure 2A:
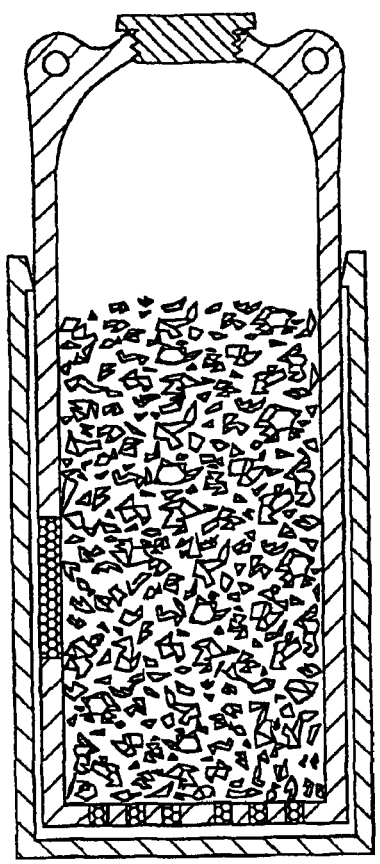

For the sake of clarity the thickness of the side wall, bottom, and top section of the embodiments shown in the Figures have been exaggerated.

DESCRIPTION OF PREFERRED EMBODIMENTS

The first preferred single-use embodiment of the moisture absorption apparatus of the invention illustrated in FIGS. 1a and 1b comprises a desiccant container 1 and a desiccant solution container 2 of a slightly resilient polymer material, such as high density polyethylene. Both are of substantially cylindrical form. The outer diameter of the desiccant container 1 is slightly smaller than the inner diameter of the desiccant solution container 2 so that it can be inserted in the latter for assemblage; FIGS. 1a and 1b illustrate the apparatus in an assembled state. The desiccant container 1 has a bottom 3 with a number of through bores 4. Its cylindrical wall 5 comprises large window 6 and joins smoothly a top section 7 which closes the container compartment 8. The stop section 8 is provided with ears 9 and eyes 10 for fastening the apparatus by means of a cord or similar to an inner wall of a transport container to be kept dry. The bottom end of the wall 5 is provided with a circumferential flange 11 of a barbed profile of a kind allowing the desiccant container 1 to be inserted into the opening of the desiccant solution container 2 which has slightly resilient walls and a corresponding oppositely disposed barbed profile inner circumferential flange 12 at its top. The desiccant solution container 2 has no openings other than the one at its top. Once the desiccant container 1 has been inserted into the desiccant solution container 2 it cannot be easily removed because of the cooperating barbed flanges 11, 12 but it can be slidingly displaced in respect of the desiccant solution container 2 within the limits set by the flanges 11, 12 and the desiccant solution container bottom 13. In the FIGS. 1a and 1b the tubiform desiccant solution container side wall is designated by reference number 14 and the desiccant solution container compartment enclosed by wall 14 and the container bottoms 3 and 13 by reference number 15. In the compartment 8 of the desiccant container 1 is disposed a closed bag 16 of plastic non-woven material containing anhydrous calcium chloride as desiccant; it rests on the bottom 3. The non-woven material is permeable to moist air and aqueous calcium chloride solution formed during the drying process.

The first embodiment of the apparatus of the invention is shown in FIG. 1a in a storage state, that is, in a state in which no drying effect is desired. In that state, the desiccant container 1 is fully inserted into the desiccant solution container 2 whereby its window 6 is shielded by the desiccant solution container 2 from moist air, the flange 12 acting as a seal in that state. The apparatus is activated by drawing the desiccant container 1 out of the desiccant solution container 2 until abutment of the flanges 11, 12. Thereby the window allows moist air of the environment to pass into the desiccant container 1. This active state of the apparatus of the invention is shown in FIG. 1b. In the bag 16 aqueous calcium chloride solution is formed by reaction of air moisture with the desiccant. The calcium chloride solution escaping from the bag 16 flows down into the desiccant solution container 2 through holes 4 in the bottom 3 and assembles on the bottom 13 of the desiccant solution container 2.

Figure 2B:
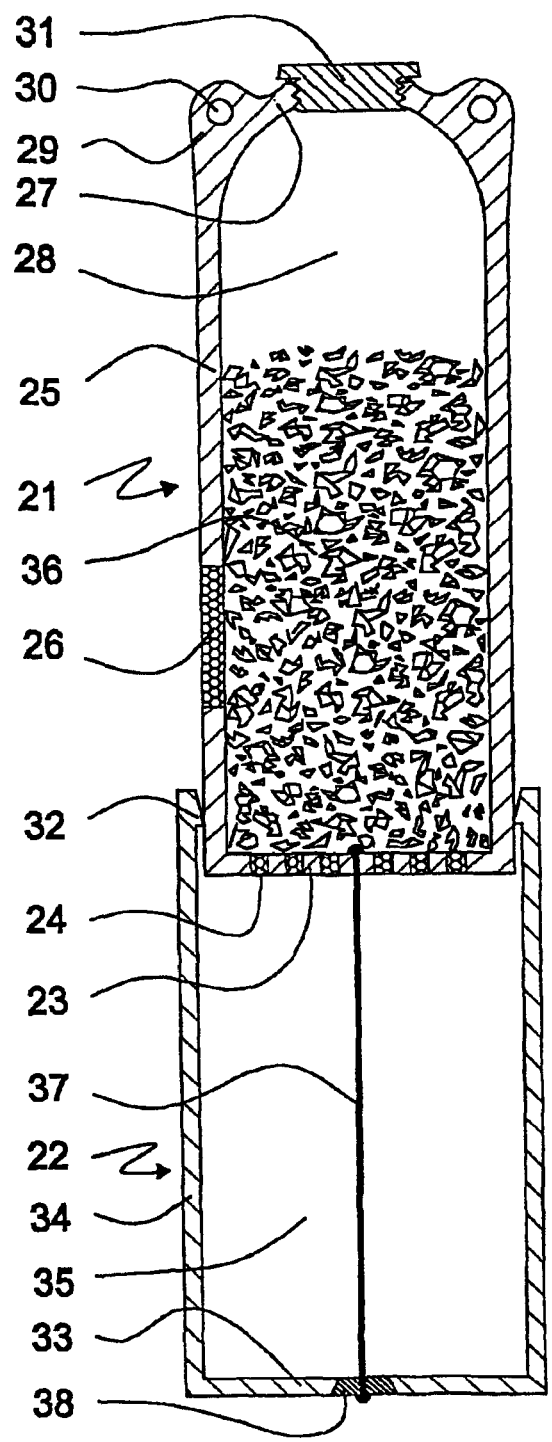
FIG. 2b shows the embodiment of 2a, in the same state and view as the embodiment of FIG. 1b.

The second preferred multiple-use embodiment of the apparatus of the invention is shown in FIGS. 2a and 2b. The top portion 27 of the cylindrical desiccant container 21 has a threaded opening tightly closed by a fitting screw plug 31 which can be removed for refilling compartment 28 with particulate desiccant 36. It is also feasible to provide the multiple-use apparatus with a larger opening for refilling with a desiccant bag like that of the first embodiment. As in the first preferred embodiment the desiccant container 21 is provided with ears 29 and eyes 30 for fixation purposes. The window 26 in the side wall 25 of the desiccant container 21 is provided with a net to retain the desiccant particles. The same is true for the through bores 24 in the desiccant container bottom 23. In the mounted state shown in the Figures the desiccant container 21 is inserted in the cylindrical desiccant solution container 22 in which it is axially displaceable from the transport or storage position shown in FIG. 2a in which the window 26 is shielded by the side wall 34 of the desiccant solution container 2. At the top rim the desiccant solution container side wall has an inner flange 32 which seals against the side wall 25 of the desiccant container 21. The compartment 35 of the desiccant solution container 22 is designed to receive the aqueous desiccant solution formed in the desiccant container 21. This solution can be emptied through a hole in the bottom 33 of the desiccant solution container 22. The emptying hole is normally closed by a rubber plug 38, as shown in FIG. 2b. A polymer cord 37 fixed at the plug 38 and the bottom 23 of the desiccant container 21 restricts the displacement of the latter in respect of the desiccant solution container 22 so as to prevent the containers 21, 22 from coming apart. For reasons of clarity the plug 38 and the cord 37 have been omitted from FIG. 2a.

What is claimed is:

1. A moisture absorption apparatus comprising:

a desiccant container having a bottom and a first side wall; the first side wall of the desiccant container having at least one access opening therethrough;

a particulate desiccant in the desiccant container, the access opening of the desiccant container permitting atmosphere outside the desiccant container to enter the desiccant container and contact the particulate desiccant therein;

a desiccant solution container having a second side wall and having a bottom for retaining a desiccant solution in the desiccant solution container;

a passage from the desiccant container into the desiccant solution container to enable flow of the desiccant solution, which is formed by moisture with the particulate desiccant in the desiccant container, to flow into the desiccant solution container;

the desiccant solution container having a second opening through which the desiccant container is slidably displaceable, and the desiccant container being slidably displaceable through the second opening into and out of the desiccant solution container selectively to a depth which exposes the access opening to the atmosphere or to a depth in the desiccant solution container sufficient for the second side wall of the desiccant solution container to cover the access opening in the first side wall of the desiccant container and prevent access of atmosphere through the access opening in the desiccant container first wall to particulate desiccant therein.

2. The apparatus of claim 1, further comprising cooperating separation prevention devices on the desiccant container and the desiccant solution container for preventing separation of the desiccant container from the desiccant solution container while permitting the sliding displacement of the containers with respect to one another.

3. The apparatus of claim 2, wherein the separation prevention devices comprise cooperating circular flanges on the desiccant container and the desiccant solution container, the flanges being so shaped and positioned as to cooperate and prevent separation of the desiccant container from the desiccant solution container.

4. The apparatus of claim 2, wherein the separation prevention devices comprise respective barbed profiles on the desiccant container and the desiccant solution container and the barbed profiles on the containers are shaped and positioned to cooperate to prevent separation of the containers.

5. The apparatus of claim 2, wherein the separation prevention devices comprise a snap connection between the desiccant container and the desiccant solution container.

6. The apparatus of claim 2, wherein
the separation prevention devices comprise a flexible element secured at the bottoms of the desiccant container and the desiccant solution container and so sized and of such material as to prevent separation of the containers.

7. The apparatus of claim 1, wherein the desiccant container has a top; and further comprising:

a third opening in the top of the desiccant container; and a removable plug in the third opening.

8. The apparatus of claim 7, wherein the second side wall of the desiccant solution container has an inner face, a seal at the inner face in the vicinity of the third opening in the desiccant solution container which is in the passage to receive desiccant solution from the desiccant container.

9. The apparatus of claim 1, further comprising a removable particulate desiccant retaining element over the access opening of the desiccant container.

10. The apparatus of claim 9, wherein the particulate desiccant retaining element comprises a net or grid over the access opening.

11. The apparatus of claim 1, wherein the desiccant container comprises a trough and a cover over the trough; the access opening being in the cover; and a snap mechanism attaching the cover to the trough.

12. A plurality of the apparatus of claim 11, each of the apparatus including a respective trough portion and a cover portion; and each of the cover portions of each apparatus having one of the air access opening openings and the air access openings have areas of at least two sizes.

13. The apparatus of claim 1, further comprising an outlet opening in the desiccant solution container for enabling exit of the desiccant solution from the desiccant solution container, and a removable plug in the outlet opening.

14. The apparatus of claim 1, further comprising a hanging device for hanging the apparatus.

15. The apparatus of claim 1, further comprising a cartridge filled with the particulate desiccant for providing the particulate desiccant in the desiccant container, the cartridge having permeable walls permeable to atmosphere and to an aqueous desiccant solution.

16. The apparatus of claim 1, wherein the desiccant container and the desiccant solution container are both of generally cylindrical shape.

17. The apparatus of claim 1, wherein the desiccant container and the desiccant solution container are of generally parallelepipedal form.

18. The apparatus of claim 1, further comprising a shield for at least partial shielding of the access opening to the desiccant container.

19. The apparatus of claim 18, wherein the shield for the access opening comprises the desiccant solution container.

20. The apparatus of claim 19, further comprising the desiccant solution container being fixable in a position which at least partially covers the access opening to the desiccant container.

* * * * *